2,886,612
Patented May 12, 1959

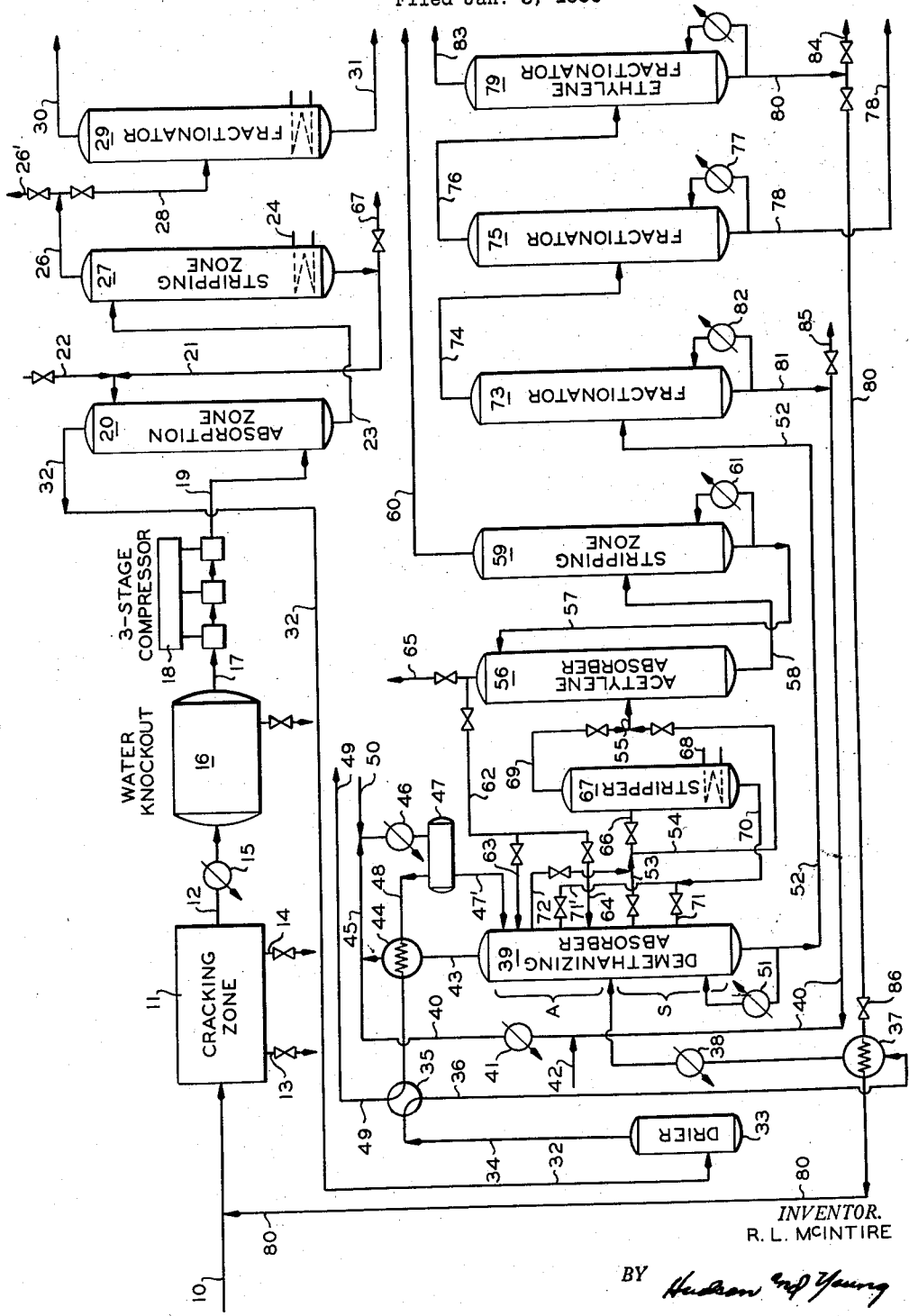

2,886,612
SEPARATION AND RECOVERY OF ACETYLENE

Robert L. McIntire, Bartlesville, Okla., assignor to Phillips Petroleum Company, a corporation of Delaware Application January 3, 1956, Serial No. 556,852

10 Claims. (Cl. 260—679)

This invention relates to the separation and recovery of acetylene. In one aspect this invention relates to the separation and recovery of acetylene from a mixture of other hydrocarbon gases. In another aspect this invention relates to the separation and recovery of acetylene from a stream of hydrocarbons such as is processed in the production of ethylene.

Ethylene is a valuable hydrocarbon and is becoming increasingly more valuable. Ethylene can be readily produced by the pyrolysis of ethane, propane or heavier materials, including reduced crudes, by short time, high temperature pyrolysis. It can also be recovered from oil refinery gases where it is a byproduct of relatively low temperature thermal and catalytic cracking operations. High temperature cracking or pyrolysis for the production of ethylene can be carried out in the presence of hot granular refractory material or can be accomplished in tubular furnaces. At the present time the most important source materials for the production of ethylene are ethane, propane and normal butane.

Acetylene is nearly always associated with ethylene when ethylene is prepared by one of the above described processes. Ethylene is difficult to separate from the other hydrocarbons and/or gases with which it is usually associated. The majority of the processes employed today for the separation and recovery of ethylene are fractionation processes and usually comprise basically, (1) a demethanizing-absorption operation carried out in a fractionating-absorber column wherein methane and lighter gases are removed (2) a deethanizing operation wherein an ethylene-ethane fraction is separated from heavier hydrocarbons and the absorbent employed in said demethanizing-absorption operation and (3) a fractionation operation wherein ethylene is separated from the ethane in said ethylene-ethane fraction. In such processes a large part of the acetylene associated with the ethylene rides through the various fractionation steps and is found in the ethylene product. In some uses of ethylene, an exceptionally high purity product is required. Consequently the further purification of the ethylene containing only small quantities of acetylene requires the handling of large volumes of material.

I have found that in the above described demethanizing-absorption operation there exist unusual acetylene concentration gradients, i.e. points of maximum acetylene concentration exist at points within the tower in which the operation is carried out. I have further found that these unexpected points of maximum acetylene concentration can exist in either or both the absorption section and the stripping section of the fractionating-absorber column, depending upon operating conditions. Thus, broadly speaking, my invention comprises withdrawing a side stream from said demethanizing-absorption column at said points of maximum acetylene concentration, treating said side stream to remove the acetylene therefrom, and returning the side stream to said column.

An object of this invention is to provide a process for the separation and recovery of acetylene from other hydrocarbons.

Another object of the invention is to provide a process for the separation and recovery of acetylene wherein a minimum quantity of material is processed.

Another object of the invention is to remove and recover acetylene from a stream of $C_1$–$C_5$ hydrocarbons, being processed for the recovery of ethylene, to the degree that a high purity ethylene, requiring no further treatment for acetylene removal, is obtained.

Other aspects, objects and advantages of the invention will be apparent to those skilled in the art upon reading the disclosure.

Thus according to the invention, there is provided a process for the recovery of acetylene from a mixture of gases comprising $C_1$ to $C_5$ plus hydrocarbons which comprises: contacting a stream of said mixture with an absorbent in a fractionating-absorber column having an absorption section and a stripping section; withdrawing a side stream from said column at a point of maximum acetylene concentration; treating said side stream to recover acetylene therefrom; and returning the treated side stream to said column.

In a fractionating-absorber column the region above the feed point comprises the absorption section of said column and the region below the feed point comprises the stripper section of said column. As stated above, the newly discovered concentration gradients for acetylene can exist in both the absorption section and the stripping section of a demethanizing-absorber column. The actual amount of acetylene in each of the said sections will depend upon the operating conditions, e.g., the amount of reboiler heat, the amount of inter-cooling, the amount of absorbent supplied to the column, etc. In the practice of this invention the side stream which is withdrawn from the column can be withdrawn from either the absorber section or the stripping section.

In one embodiment of the invention, a vaporous side stream is withdrawn from the column, said side stream is then treated to remove the acetylene therein, and the treated side stream is then returned to said column at a point above the point of withdrawal of said side stream.

In another embodiment of the invention a liquid side stream is withdrawn from said column at a point of maximum acetylene concentration, said liquid side stream is then passed to a stripping zone wherein gases containing said acetylene are stripped from said liquid, and said gases are then treated to remove the acetylene therefrom. The said liquid is then returned to the demethanizing absorber column at a point below the point of withdrawal of said side stream.

By thus withdrawing a side stream from the fractionating absorber column at a point of maximum acetylene concentration and treating the withdrawn side stream to remove acetylene therefrom, important advantages are realized. One of said advantages is that at least a major portion of the acetylene contained in the main stream being treated can be removed and recovered by processing only a minimum amount of said main stream. Another important advantage is that ethylene of high purity, which requires no further treatment for the removal of acetylene, can be produced. In any event, in most instances where ethylene of exceptionally high purity is required, the load in the ethylene purification equipment will be reduced.

The drawing is a diagrammatic flow sheet illustrating the several embodiments of the invention. In said flow sheet, much conventional equipment such as valves, condensers, heat exchangers, regulators and other equipment, etc., have been omitted for the purposes of simplicity. The use of such apparatus is well known to those skilled in the art and is within the scope of the invention.

Referring now to the drawing, the invention will be more fully explained. A stream of hydrocarbons, predominantly ethane, is charged through line 10 to cracking zone 11 which can be a thermal cracking zone or a catalytic cracking zone. If zone 11 is a thermal cracking zone the cracking can be accomplished in a tubular type furnace or can be carried out in the presence of a moving bed of hot granular refractory material. The latter is generally preferred when the cracking operation is being carried out primarily for the production of ethylene. In any event, it is to be understood that cracking zone 11 includes the necessary equipment for effecting a preliminary separation of the cracking reaction products so that a stream of gaseous effluent, comprising a mixture of $C_1$ to $C_5$ plus hydrocarbons and hydrogen, can be removed through line 12. Other heavier products of the cracking reaction can be removed through lines 13 and 14.

Said gaseous effluent is passed through cooler 15 and into water knockout drum 16 wherein water, introduced as steam in cracking zone 11, is removed. The gases are then passed through line 17 into the first stage of a three stage compression zone 18. Various intercoolers, liquid traps, etc. between the compression stages have been omitted for simplicity. Compressed effluent is passed through line 19 into absorption zone 20 wherein it is contacted countercurrently with a stream of absorbent introduced through line 21. Said absorbent on initially starting the unit can be a mineral seal oil of approximately 400–450° F. boiling range added through line 22. Enriched absorbent, having absorbed therein essentially all the $C_5$ plus hydrocarbons and some of the $C_3$ and $C_4$ hydrocarbons contained in said compressed effluent, is withdrawn from absorber 20 through line 23 and introduced into absorbent stripper 27 wherein the absorption oil is stripped by means of heat introduced into reboiler coil 25 through line 24 from a source, not shown, and the said absorbed hydrocarbons are removed overhead through lines 26 and 26' to storage or other use as desired. The product removed through line 26 usually contains a substantial proportion of aromatics. Excess absorbent which builds up in the system after a period of time on stream is withdrawn through line 67 or removed overhead from stripper 27 through line 26. During operation the original mineral seal oil, used in starting up the system, is gradually replaced by material produced in the process. Thus after a period of time the gas stream in line 19 is contacted in absorber 20 with a stream of hydrocarbons produced in the process. If desired, the $C_3$ to $C_5$ hydrocarbons removed overhead from absorbent stripper 27 through line 26 can be passed through line 28 into fractionator 29 and the $C_3$ to $C_4$ hydrocarbons removed overhead therefrom via line 30. $C_5$ hydrocarbons are removed as bottoms product from said fractionator 29 through line 31 to storage or other use as desired.

The overhead stream from absorption zone 20, comprising $C_1$ to $C_4$ hydrocarbons and hydrogen, is passed via line 32 into drier 33 which contains a desiccant such as bauxite. In drier 33 the water vapor dew point of the stream is reduced to approximately —40° F. or lower in order to prevent the formation of ice and hydrates during further processing. From drier 33 the said stream is passed through line 34, heat exchanger 35, line 36, heat exchanger 37, and refrigerated cooler 38 into demethanizing absorber 39. Heat exchangers 35 and 37 are shown as single units. In actual practice each will probably be a series of heat exchangers wherein the temperature of the said $C_1$ to $C_4$ and hydrocarbon stream is progressively reduced. In demethanizing absorber 39 said stream is contacted countercurrently with an absorbent, comprising a mixture of hexanes plus some higher hydrocarbons, introduced via line 40 (from a source described hereinafter) through refrigerated cooler 41, line 36, refrigerated cooler or condenser 46, accumulator 47, and line 47'. Make-up absorbent can be added through line 42 as desired or necessary. It is to be noted that demethanizing absorber 39 is a fractionating absorber. In operation the upper portion A functions as an absorption section and the lower portion S functions as a stripping section. Residue gas comprising hydrogen and methane, together with a small amount of $C_2$ hydrocarbons, is removed overhead through line 43, heat exchanger 44, and passed via line 45, and refrigerated condenser 46 into accumulator 47. Uncondensed gases are removed from said accumulator 47 through line 48, heat exchanger 44, heat exchanger 35, and passed via line 49 to fuel gas or other use. Demethanizing absorber 39 can be equipped with refrigerated intercoolers on the absorption section A as an aid in removing the heat of absorption. The use and operation of said intercoolers is well known to those skilled in the art and they have been omitted from the drawing for simplicity.

As a further aid in preventing the formation of ice and hydrates a small amount of methanol can be introduced through line 50 when needed.

Rich absorbent from the absorption section A of demethanizing absorber 39 is passed into stripping section S which is reboiled by means of heat introduced in reboiler 51. Said stripping section is operated under conditions so as to essentially completely remove methane from the said rich absorbent. Said methane passes out through line 43 as described above. Partially stripped rich absorbent, i.e., essentially completely methane free and containing absorbed $C_2$ to $C_4$ hydrocarbons is withdrawn through line 52 for further processing as described hereinafter.

In a presently preferred embodiment of the invention, a vaporous side stream is withdrawn from demethanizing absorber 39 through line 53 and passed via lines 54 and 55 into acetylene absorber 56 wherein it is contacted countercurrently with an absorbent, selective for acetylene, introduced via line 57. Rich selective absorbent containing absorbed acetylene is withdrawn from absorber 56 via line 58 and passed into stripper 59 wherein said acetylene is stripped from said rich absorbent and removed via line 60 for storage or other use as desired. Heat is supplied to stripping zone 59 by means of reboiler 61. Lean selective absorbent is withdrawn from the bottom of said stripping zone 59 via line 57 and introduced into absorber 56 as described. Treated side stream having the acetylene removed therefrom, is removed from absorber 56 via line 62 and returned to said demethanizing absorber 39 at a point above the point of withdrawal of said side stream. Said treated side stream can be introduced into said demethanizing absorber through either lines 63 or 64. If desired, said treated side stream can be passed through line 65 for other use or storage as desired.

In another embodiment of the invention a liquid side stream can be withdrawn from demethanizing absorber 39 through line 53. It will be understood by those skilled in the art that the position of line 53 as here illustrated is diagrammatic only and that said line 53 can be positioned so as to withdraw either vapor or liquid from the desired tray location in demethanizing absorber 39. When said side stream withdrawn through line 53 is a liquid, it is introduced via line 66 into stripper 67 wherein said side stream is heated by means of heat introduced through heating coil 68, from a source not shown, and a stream of gases containing the acetylene formerly in said side stream is removed from said stripper 67 via line 69 and introduced via line 55 into acetylene absorber 56. In absorber 56 said gases are contacted with an absorbent selective for the absorption of acetylene as previously described and acetylene is removed from the rich selective absorbent in stripping zone 59 and passed via line 60 to storage or other use as previously described. Nonabsorbed gases from absorber 56 are removed overhead therefrom and can be handled via lines 62 or 65 as previously described. The remaining liquid side stream in stripper 67 from which said gases containing acetylene were stripped is removed from the bottom of said stripper via line 70 and introduced into demethanizing absorber 39 via line 71 at a point below the point of removal of said side stream.

As previously mentioned, the side stream can be withdrawn from the absorption section A as well as the stripping section S of said demethanizing absorber. When a side stream is withdrawn through line 72 into line 53, it can be introduced into either line 54 or line 66, depending upon whether it is vaporous or liquid, for treatment to recover its acetylene content. The treated side stream can be returned to demethanizing absorber 39 through line 63 or line 71' depending upon whether the side stream was withdrawn as a vapor (return via line 63) or as a liquid (return via line 71'). As in the case of line 53, it will be understood by those skilled in the art that the position of line 72 as herein illustrated is diagrammatic and said line 72 can be so positioned as to withdraw either a vaporous or liquid side stream from the desired tray in the absorption section of said demethanizing absorber 39.

The partially stripped rich absorbent, i.e., essentially completely methane free, and containing absorbed $C_2$ to $C_4$ hydrocarbons, which is withdrawn from demethanizing absorber 39 through line 52, is passed into fractionator 73. Heat is supplied to fractionator 73 by means of reboiler 82. Lean absorbent having the absorbed hydrocarbons removed therefrom is removed from fractionator 73 via line 81 and returned to demethanizing absorber 39 via line 40. An overhead stream comprising $C_2$ to $C_4$ hydrocarbons is removed from fractionator 73 via line 74 and introduced into fractionator 75. An overhead stream comprising ethane and ethylene is removed from fractionator 75 via line 76 and introduced into ethylene fractionator 79 wherein a separation is effected between said ethylene and said ethane; said ethylene being removed overhead via line 83 for storage or other use as desired. Heat is supplied to fractionator 75 by means of reboiler 77. Ethane is removed from said fractionator 79 via line 80 and can be passed to storage or other use via line 84, or recycled via line 80, through expansion valve 86 to supply refrigeration for heat exchanger 37, and introduced into line 10 as a portion of the charge to cracking zone 11. $C_3$ to $C_4$ hydrocarbons are withdrawn as bottoms product from fractionator 75 through line 78 and passed to storage or other use as desired. Any build-up of demethanizing absorbent can be withdrawn through line 85 if desired or necessary.

Operating conditions in the demethanizing absorber 39 can be varied according to the source of the ethylene containing stream and the purity of the product desired. As will be understood by those skilled in the art these conditions can vary as follows:

|  | Broad Range | Preferred Range |
|---|---|---|
| Feed to tower, °F | 0 to −100 | −25 to −75 |
| Top of tower, °F | 0 to −100 | −25 to −75 |
| Bottom of tower, °F | 50 to 150 | 75 to 125 |
| Pressure, p.s.i.a | 200 to 600 |  |

Operating conditions on cracking zone 11, absorber 20, the pressure to which the gaseous effluent is compressed, etc., will all vary with the type of cracking employed in cracking zone 11 and the type of feed stock charged thereto. When charging a feed stock predominantly ethane, and cracking in the presence of a moving bed of hot granular refractory material, the cracking can be carried out at a temperature within the range of 1300–1800° F. and a pressure within the range of 10–35 p.s.i.a. In general the operating conditions on these units will be chosen to obtain the desired results. For example if propane and butanes are cracked different cracking conditions would prevail. The amount of $C_3$, $C_4$ and $C_5$ plus materials to be removed in absorber 20 would be increased and operating conditions on said absorber would be changed accordingly.

Operating conditions in the remainder of the units shown in the drawing will be chosen according to the composition and volume of the streams being processed.

In acetylene absorber 56 the volume of selective solvent employed will depend upon the kind of solvent and the amount of acetylene to be removed. When using DMF (dimethylformamide), a presently preferred solvent, and treating a stream containing from 0.1 to 25 percent by volume acetylene, the solvent to gas charge ratio will usually be in the range of 0.25 to 5 mols of solvent per mol of charge. Said treating can be carried out at temperatures within the range of +25 to −75° F. and at a pressure within the range of 100 to 500 p.s.i.g. Other selective solvents such as acetone can also be employed in acetylene absorber 56.

The invention is not to be limited to selective absorption for the removal of acetylene. Other methods for the removal of acetylene, such as selective hydrogenation, can be employed to treat the stream in line 55. Liquid-liquid solvent extraction can be employed when the acetylene containing stream is a liquid.

The following examples will serve to further illustrate the invention.

EXAMPLE I

A feed stream comprising $C_1$ to $C_4$ plus hydrocarbons and hydrogen is charged at a temperature of −56° F. to the 9th tray of a 14 tray demethanizing-absorber column. In said column said stream is contacted with an absorbent comprising a mixture of hexanes together with some higher hydrocarbons introduced on the 14th tray (top tray) in an amount of 40 mols of absorbent per 100 mols of feed stream. The top of said column is maintained at a temperature of −56° F. A reboiler on the bottom of said column supplies sufficient heat to maintain the bottom of the tower at 94° F. It is found that a point of maximum acetylene concentration exists in the vapor rising from the 5th tray and in the liquid on the 6th tray of said column. The column pressure is 400 p.s.i.a. Table 1 below shows a material balance for this operation.

Table 1

MATERIAL BALANCE

| Component | Feed, Mols | Overhead, Mols | Bottoms, Mols |
|---|---|---|---|
| $H_2$ | 32.63 | 32.63 | 0.0 |
| $CH_4$ | 7.52 | 7.50 | 0.02 |
| $C_2H_4$ | 30.61 | 0.46 | 30.15 |
| $C_2H_2$ | 0.41 | 0.05 | 0.36 |
| $C_2H_6$ | 27.99 | 0.01 | 27.98 |
| $C_3+$ | 0.61 | 0 | 0.61 |
| $C_4+$ | 0.24 | 0 | 0.24 |
| $C_6+$* | 0 | 0.01 | *40.0 |
| Total Mols | 100.0 | 40.66 | 99.36 |

*Absorbent.

Table 2 below shows the concentration gradients for acetylene which exist in the demethanizing-absorber for the above operation of Example I.

Table 2

CONCENTRATION GRADIENTS FOR ACETYLENE IN A DEMETHANIZING-ABSORBER

| Tray No. | Liquid, Mol Percent | Vapor, Mol Percent |
|---|---|---|
| 14 | 0.17 | 0.14 |
| 13 | 0.32 | 0.27 |
| 12 | 0.41 | 0.39 |
| 11 | 0.49 | 0.50 |
| 10 | 0.50 | 0.56 |
| 9 | 0.48 | 0.56 |
| 8 | 0.83 | 1.36 |
| 7 | 1.02 | 1.92 |
| 6 | ¹1.08 | 2.16 |
| 5 | 1.06 | ¹2.19 |
| 4 | 1.00 | 2.08 |
| 3 | 0.89 | 1.88 |
| 2 | 0.75 | 1.60 |
| 1 | 0.59 | 1.28 |
| 0 ² | 0.37 | 0.92 |

¹ Point of maximum concentration.
² Kettle.

EXAMPLE II

In the operation of the above Example I, 69 volume percent of the vapor rising from the 5th tray is withdrawn as a side stream. Said side stream is contacted countercurrently in an absorber at a temperature of 0° F. and 300 p.s.i.g., with 1 mol of dimethylformamide per mol of vapor. Essentially all of the acetylene contained in said side stream is absorbed. The unabsorbed vapors are returned to the demethanizing-absorber column at a point above the point of withdrawal of the side stream, i.e., just below the 6th tray. The operating conditions in the demethanizing-absorber column are essentially the same as given in Example I. Table 3 below shows a material balance of this operation.

Table 3
MATERIAL BALANCE

| Component | Feed, Mols | Overhead, Mols | Bottoms, Mols | Withdrawn Side Stream, Mols | Returned Side Stream, Mols |
|---|---|---|---|---|---|
| $H_2$ | 32.63 | 32.63 | 0.0 | 0.00 | 0.00 |
| $CH_4$ | 7.52 | 7.50 | 0.02 | 2.88 | 2.88 |
| $C_2H_4$ | 30.61 | 0.46 | 30.15 | 29.10 | 29.10 |
| $C_2H_2$ | 0.41 | 0.04 | 0.10 | 0.27 | 0.00 |
| $C_2H_6$ | 27.99 | 0.01 | 27.98 | 11.55 | 11.55 |
| $C_3+$ | 0.61 | 0 | 0.61 | 0.07 | 0.07 |
| $C_4+$ | 0.24 | 0 | 0.24 | 0.01 | 0.01 |
| $C_6+$* | 0 | 0.01 | 40.00 | 0.10 | 0.10 |
| Total Mols | 100.00 | 40.65 | 99.10 | 43.98 | 43.71 |

*Absorbent.

The mol percent of acetylene in the kettle product of Example II above is 0.10 whereas in Example I above the acetylene content of the kettle product is 0.37 mol percent. Thus the acetylene content of the kettle product is reduced almost 73 percent by treating only 69 percent of the vapor from one tray only, said vapor being withdrawn at the point of maximum acetylene concentration. The advantages of treating a small vaporous side stream to effect a 73 percent reduction in acetylene content in the kettle product will be readily appreciated by those skilled in the art. By removing more of the vapors from the 5th tray the acetylene content of the kettle product can be reduced even more.

One important advantage is that in many instances the acetylene content will be reduced sufficiently that further treatment of the ethylene stream is unnecessary. In any event, the amount of acetylene to be removed from the ultimate ethylene stream is reduced. Another advantage is that the acetylene can be recovered for sale or use.

Ethylene is used as a raw material in the manufacture of ethylene glycol, other hydrocarbons by alkylation, and plastics such as polyethylene. Acetylene is used as a welding gas and in the manufacture of chloroprene, vinyl chloride, acrylonitrile and other materials.

Herein and in the claims, unless otherwise stated, the term "$C_1$ to $C_5$ plus hydrocarbons" refers to and includes $C_1$, $C_2$, $C_3$, $C_4$, and $C_5$ hydrocarbons plus small amounts of $C_6$ and $C_7$ hydrocarbons sometimes associated therewith in hydrocarbon mixtures. In said term, $C_1$ refers to methane; $C_2$ refers to and includes all hydrocarbons containing two carbon atoms per molecule such as acetylene, ethylene and ethane; $C_3$ refers to and includes all hydrocarbons containing three carbon atoms per molecule such as propylene and propane; $C_4$ refers to and includes all hydrocarbons containing four carbon atoms per molecule such as butenes, iso-butenes, butane, isobutane, and butadiene; $C_5$ refers to and includes all hydrocarbons containing five carbon atoms per molecule such as pentenes, pentadienes, iso-pentenes, pentane and iso-pentanes.

As will be evident to those skilled in the art, various modifications of this invention can be made, or followed, in the light of the foregoing disclosure and discussion, without departing from the spirit or scope of the invention.

I claim:

1. A process for the recovery of acetylene from a mixture of gases comprising $C_1$ to $C_5$ plus hydrocarbons which comprises: contacting a stream of said mixture with an absorbent in a hydrocarbon separation zone having an absorption section and a stripping section; withdrawing a side stream from said separation zone at a point of maximum acetylene concentration; contacting gases contained in said side stream with a selective absorbent in an absorption zone so as to selectively absorb the acetylene therein; returning treated unabsorbed gases, now substantially free of acetylene, from said absorption zone to said separation zone at a point above the point of withdrawal of said side stream; and recovering said acetylene from the resulting rich selective absorbent from said absorption zone.

2. A process for the recovery of acetylene from a mixture of gases comprising $C_1$ to $C_5$ plus hydrocarbons and hydrogen which comprises: contacting a stream of said mixture with an absorbent in a hydrocarbon separation zone having an absorption section and a stripping section; withdrawing a vaporous side stream from said separation zone at a point of maximum acetylene concentration; contacting said side stream with a selective absorbent in an absorption zone so as to selectively absorb the acetylene therein; returning treated unabsorbed gases, now substantially free of acetylene, from said absorption zone to said separation zone, at a point above the point of withdrawal of said side stream; and recovering said acetylene from the resulting rich selective absorbent from said absorption zone.

3. The process of claim 2 wherein said side stream is withdrawn from the stripping section of said column.

4. The process of claim 2 wherein said side stream is withdrawn from the absorption section of said column.

5. A process for the recovery of acetylene from a mixture of gases comprising $C_1$ to $C_5$ plus hydrocarbons and hydrogen which comprises: contacting a stream of said mixture with an absorbent in a hydrocarbon separation zone having an absorption section and a stripping section; withdrawing a liquid side stream from said separation zone at a point of maximum acetylene concentration; passing said side stream to a stripping zone; removing a mixture of gases comprising acetylene from an upper portion of said stripping zone; withdrawing substantially acetylene free liquid from a lower portion of said stripping zone and returning same to said separation zone at a point below the point of withdrawal of said side stream; contacting said gases comprising acetylene with a selective absorbent in an absorption zone so as to selectively absorb said acetylene therein; returning treated unabsorbed gases, now substantially free of acetylene, from said absorption zone to said separation zone at a point above the point of withdrawal of said side stream; and recovering said absorbed acetylene from the resulting rich selective absorbent.

6. The process of claim 5 wherein said side stream is withdrawn from the stripping section of said column.

7. The process of claim 5 wherein said side stream is withdrawn from the absorption section of said column.

8. A process for the production and recovery of acetylene which comprises: cracking a stream of normally gaseous hydrocarbons in a cracking zone under cracking conditions to produce a cracking zone gaseous effluent containing hydrogen and $C_1$ to $C_5$ plus hydrocarbons; compressing said effluent; passing said compressed effluent to a first absorption zone and therein removing substantially all of said $C_5$ plus hydrocarbons and a portion of said $C_3$ to $C_4$ hydrocarbons; contacting the resulting mixture of hydrogen and $C_1$ to $C_5$ hydrocarbons with an absorbent in a hydrocarbon separation zone having an absorption section and a stripping section; withdrawing rich absorbent, substantially free of $C_1$ hydrocarbon, from the bottom of said stripping section and passing same to a fractionation zone; fractionating said rich absorbent in said fractionation zone to recover a stream consisting essentially of ethylene, a stream consisting essentially of ethane, and a stream comprising said absorbent and said $C_3$–$C_4$ hydrocarbons; withdrawing a vaporous side stream from said hydrocarbon separation zone at a point of maximum acetylene concentration; contacting said side stream with a selective absorbent in a second absorption zone so as to selectively absorb the acetylene therein; returning treated unabsorbed gases, now substantially free of acetylene, from said second absorption zone to said separation zone at a point above the point of withdrawal of said side stream; and recovering said acetylene from the resulting rich selective absorbent.

9. The process of claim 8 wherein said stream of normally gaseous hydrocarbons is a mixture comprised of propane and butane; said cracking in said cracking zone is carried out in the presence of hot granular refractory material; said absorbent employed in said hydrocarbon separation zone is propane; a portion of said stream comprising said absorbent and said $C_3$–$C_4$ hydrocarbons is returned to said cracking zone as feed thereto; and said side stream is withdrawn from the stripping section of said column.

10. The process of claim 8 wherein said stream of normally gaseous hydrocarbons is a mixture comprised of propane and butane; said cracking in said cracking zone is carried out in the presence of hot granular refractory material; said absorbent employed in said hydrocarbon separation zone is propane; a portion of said stream comprising said absorbent and said $C_3$–$C_4$ hydrocarbons is returned to said cracking zone as feed thereto; and said side stream is withdrawn from the absorption section of said column.

References Cited in the file of this patent

UNITED STATES PATENTS

| | | |
|---|---|---|
| 1,405,395 | Bahlke et al. | Aug. 6, 1946 |
| 2,661,812 | Gilmore | Dec. 8, 1953 |